June 17, 1969     C. H. McQUEEN     3,450,437
AUXILIARY TRUCK BODY
Filed Oct. 10, 1966
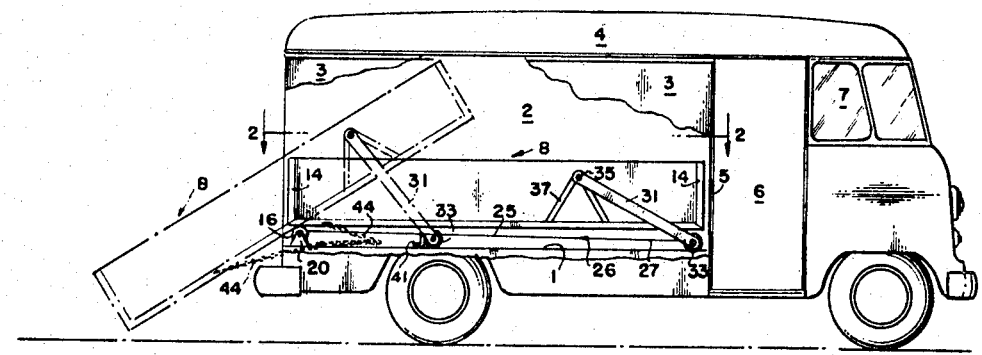
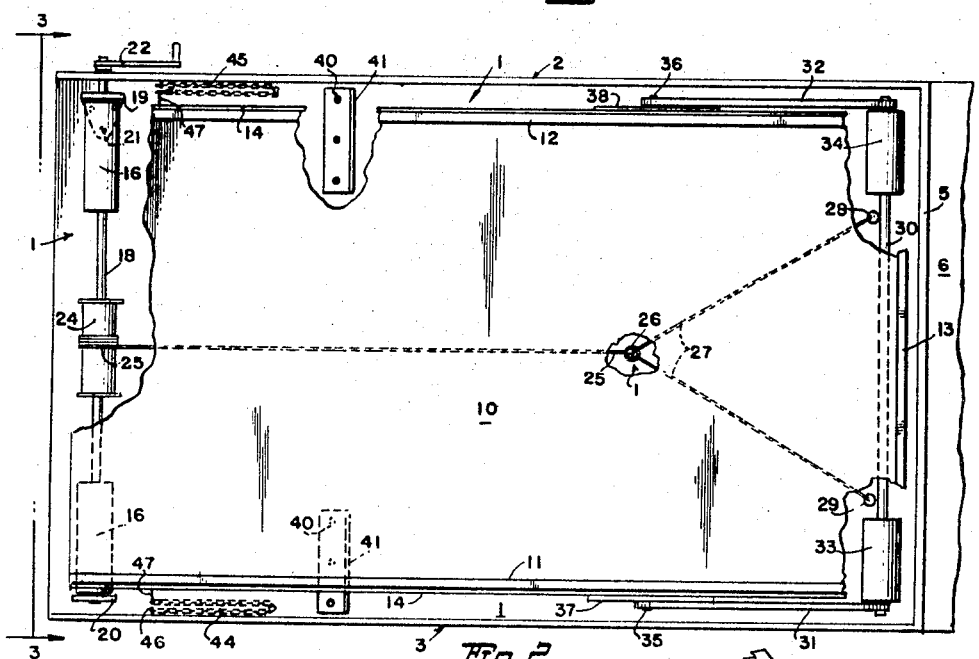
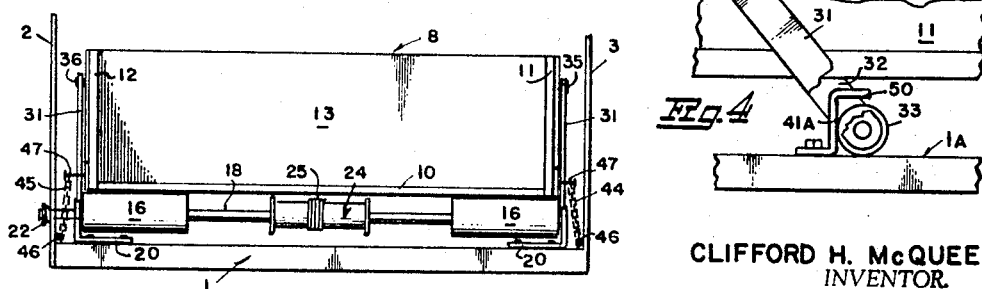
CLIFFORD H. McQUEEN
*INVENTOR.*
BY *James D. Girman*
ATT'Y United States Patent Office
3,450,437
Patented June 17, 1969

3,450,437
AUXILIARY TRUCK BODY
Clifford H. McQueen, Portland, Oreg., assignor of fifty percent to Elmer W. Hunter, Portland, Oreg.
Filed Oct. 10, 1966, Ser. No. 585,389
Int. Cl. B60p 1/32; B65g 67/24
U.S. Cl. 298—14      3 Claims

ABSTRACT OF THE DISCLOSURE

An auxiliary dump body adapted for installation within a panel delivery truck and including means for quickly and conveniently moving the dump body from a load-receiving to a load-carrying position within the truck body and controlled rearward movement therefrom into a dumping position. Said means including elongated rollers disposed one each at the four corners of the underside of the box to stabilize the same with any applied load throughout the operative range of the box.

---

This invention relates generally to automotive vehicles and more particularly to an auxiliary truck body in the form of a dump-box particularly well adapted for use with the flat bed of any type of truck such as a panel delivery truck, pick-up truck, and the like but such use as herein shown and described does not necessarily prescribe any limits of utility since it will be apparent from the following disclosure that the invention is also readily adaptable for use on trailers and other load-carrying vehicles.

One of the principal objects of the invention is to provide an auxiliary dump body of the character described which is of simple, efficient, durable and inexpensive construction conveniently adaptable for operative installation in any type of truck, as aforesaid, readily removable therefrom when desired.

Another important object is the provision of means carried by and associated with the dump body for quickly and conveniently rendering it movable from a load-receiving to a load-carrying position within the truck body and controlled rearward movement therefrom into a dumping position.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of a panel delivery truck with a fragment of one side wall broken away to illustrate a dump box and its installation on the interior of the truck body in accordance with my invention.

FIGURE 2 is a top plan view taken approximately along the line 2—2 of FIGURE 1 with fragments broken away for convenience of illustration.

FIGURE 3 is an end elevational view taken approximately along the line 3—3 of FIGURE 2, and FIGURE 4 is a framentary detail view of the dump body, lifting arms associated therewith and rearward limit stops therefor.

With continuing reference to the drawing wherein like reference numerals designate like parts, reference numeral 1 indicates generally the conventional flatbed or floor of the body of a truck, which although herein shown and described as a panel delivery truck does not necessarily prescribe any limits of utility of the invention. The flatbed is provided with side walls or panels 2–3, a roof 4 and a front bulkhead 5 closing off the truck body from an entrance or doorway 6 to the driver's cab 7.

The main body of the present invention, indicated generally at 8, is in the form of a dump box open at its rearward end, as shown, and having a bottom wall 10, side walls 11–12 and closed at its forward end by a front wall 13. The box in the interest of light weight and hence easy handling is preferably, though not restrictively, made of plywood and all the walls are reinforced by band iron 14 or the like secured along the marginal edges thereof by screws or bolts (not shown) or in any other suitable manner. It will be readily understood that the dump body may also be made of sheet metal or other suitable material if desired.

The rearward end of the bottom wall 10 rests at all times upon a pair of elongated rollers 16 secured to and rotatable with a shaft 18 journalled in bearing brackets 19–20 secured as at 21 to opposite sides of the truck bed 1 and inset forwardly therefrom any desired distance. Shaft 18 may extend through either panel wall (2, for example) for removable securement of a crank handle 22.

Secured to shaft 18 intermediate the inner ends of rollers 16 is a hand winch 24 having a cable 25 wound therearound with one end of the cable attached as at 26 to a bridle 27 secured at its forward end as at 28–29 to a shaft 30 carried by the forward end of a pair of lifting arms 31–32. A pair of elongated lift rollers 33–34 are rotatably mounted upon the shaft 30 and at all times in rolling contact with the truck bed 1. The arms 31–32 are inclined upwardly and rearwardly (FIG. 1) and pivotally attached at their top ends as at 35–36 (FIG. 2) to the top end of A-frames 37–38 also secured to the box walls 11–12 and by welding or the like to the underlying reinforcing bands 14.

Secured as at 40 to opposite sides of the top of the truck bed 1 are two transversely aligned angle sections 41 serving as limit stops for rearward travel of the rollers 33–34. Cooperating with these limit stops in the modus operandi are two chains or cables 44–45 secured one each to the truck body as at 46 and to the box walls 11–12 as at 47.

In the modified form of roller limit stops shown in FIGURE 4, I replace the angle sections 41 of the first form with Z-sections 41A.

From the foregoing it will be apparent that a rearward pull on cable 25, shaft 30 and rollers 33–34 upon rotation of the shaft 18 and winch 24 by crank handle 22 will pull the lift arms 31–32 and rollers 33–34 rearwardly from their full line position shown in FIGURE 1. The resultant upward swing of the lift arms about the hinge line established by shaft 18 as they travel rearwardly along the truck bed will tilt the dump box 8 into the dumping position shown in broken lines or to any desired intermediate position such, for example, as one where the dump body would be only partially extended from the rear of the truck body while still in a horizontal position for loading purposes.

The limit of such rearward movement and tilt of the box is reached when rollers 33–34 come into abutment with the limit stops 41 while at the same time the chains or cables 44–45 reach their extended limit rearwardly of the points of anchorage to the truck body. Such limitation will insure holding the dump box 8 in its full rearwardly inclined dumping position and out of contact with the ground, as shown, to insure complete discharge of the load.

In this same operation the horizontal flanges 50 of the modified form of limit stops 41A (FIG. 4) will cooperate with the chains 44–45 for the purpose intended and further prevent any possibility of the forward end of the dump box from striking the roof 4 of the vehicle.

It will be readily understood that the utility of the dump body is not necessarily limited to the flatbed of a truck body or the like since it is readily adaptable for equally effective operation on any flat supporting surface or platform such as on loading docks and similar load-dispensing structures. In contrast to narrow gauge wheels, pulleys and the like used in ordinary structures I am aware of for analogous purposes, the elongated rollers 16, 33 and 34 of my invention are of particular importance because of the lineal extent of their rolling contact with the dump box 8 and resultant weight-distribution at both ends of the box provide complete stabilization of any applied load. The elongated rollers also enable free forward and rearward rolling movement of a dump body of any width, within reasonable limits, without the use of guide strips, tracks or rails, all of which constitute a distinct improvement in the art in point of cheapness in manufacture, ease in operation, efficiency in action and durability in service.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

1. An auxiliary dump body of box-like formation including a pair of opposed vertical side walls in combination with a vehicle having a flat load-supporting platform coextensive with said body,
   said dump body and platform each having a forward end and a rearward end,
   a pair of spaced apart bearing brackets secured one each to said platform adjacent said rearward end thereof,
   a first shaft journalled in said brackets with one end of the shaft extending outwardly relative to said platform,
   a crank handle secured to said extended end of the shaft,
   a first pair of elongated rollers secured to and rotatable with said shaft,
   a hand winch secured to said shaft intermediate said rollers and rotatable therewith,
   said dump body at all times in rolling engagement with said rollers,
   a pair of upwardly and rearwardly inclined lift arms disposed one each adjacent the forward end of said dump body,
   means pivotally attaching the upper end of said arms to the side walls of the dump body adjacent the top edge thereof,
   a second shaft interconnecting the forward end of said lift arms,
   a second pair of elongated lift rollers rotatably carried by said second shaft in contact with said platform and disposed one each adjacent said lift arms,
   a pair of first limit stops secured one each to said platform at the sides thereof in transverse alignment with each other,
   each of said limit stops comprising a vertical web and a forwardly extending flange at the upper end thereof,
   a cable having one of its ends secured to said hand winch and extending forwardly therefrom,
   a flexible bridle secured at opposite ends to said second shaft,
   the mid-portion of said bridle secured to the end of the cable extending forwardly from said winch,
   and second flexible limit stop means located at the rear of said dump body attached to said body and said vehicle to control the rearward movement of said dump body,
   whereby controlled rotation of said winch will pull the dump body rearwardly and partially outwardly from the rear end of the supporting platform in a horizontal position for loading purposes and continued rotation of the winch will pull the dump body rearwardly to a limit established by said second limit stop means, further rotation of said winch causing said lift arms to raise said body until said lift rollers abut said first limit stops.

2. The combination as claimed in claim 1 wherein:
   said dump body includes a bottom wall, side walls and is open at its rearward end and closed at its forward end by an end wall, and
   said second stop means includes chains secured at one of their ends to said platform and at their opposite ends to said dump body.

3. An auxiliary dump body as claimed in claim 1, wherein:
   said second pair of elongated rollers are at all times in rolling contact with the surface of said load supporting platform and movable therealong without the aid of guide strips, rails, or tracks.

References Cited

UNITED STATES PATENTS

| | | | |
|---|---|---|---|
| 613,198 | 10/1898 | Hall | 298—14 |
| 637,523 | 11/1899 | O'Connor | 298—14 |
| 841,406 | 1/1906 | Kaufman | 298—14 |
| 1,392,448 | 10/1921 | Randall | 298—14 |
| 1,561,286 | 11/1925 | Snyder | 298—14 |
| 2,529,558 | 11/1950 | Klingebiel | 298—14 |
| 3,055,709 | 9/1962 | Kirkwood | 298—14 X |

RICHARD J. JOHNSON, *Primary Examiner.*